Nov. 18, 1947.  S. E. MEYERS  2,431,187
AUTOMATIC PNEUMATIC CONTROL AND ENERGIZING
SYSTEM FOR REVERSIBLE AIR MOTORS
Filed Feb. 12, 1946  8 Sheets-Sheet 1

Inventor:-
Sidney E. Meyers,
By Wm. F. Freudenreich,
Attorney.

Nov. 18, 1947.  S. E. MEYERS  2,431,187
AUTOMATIC PNEUMATIC CONTROL AND ENERGIZING
SYSTEM FOR REVERSIBLE AIR MOTORS
Filed Feb. 12, 1946  8 Sheets-Sheet 7

Inventor:-
Sidney E. Meyers
By
Wm. F. Freudenreich,
Attorney.

Patented Nov. 18, 1947

2,431,187

UNITED STATES PATENT OFFICE 2,431,187

AUTOMATIC PNEUMATIC CONTROL AND ENERGIZING SYSTEM FOR REVERSIBLE AIR MOTORS

Sidney E. Meyers, New York, N. Y., assignor to Vulcan Soot Blower Corporation, a corporation of Pennsylvania Application February 12, 1946, Serial No. 646,999

10 Claims. (Cl. 121—39)

1

There are many places where an air motor may be used to advantage to operate intermittently first in one direction and then in the opposite direction, the starting of the motor being under local or remote control and the stopping being automatic; and the present invention has for its object to produce a simple, novel and efficient system for this purpose.

In the soot blower art, for example, it is common to operate a tubular blowing element so as to turn or sweep, first in one direction and then in the other; and, in one of its aspects, the present invention may be said to have for its object to produce a simple and novel motor and control system for this purpose.

The various features of novelty whereby the present invention is characterized will hereinafter be pointed out with particularity in the appended claims; but, for a full understanding of the invention and of its objects and advantages, reference may be had to the following detailed description taken in connection with the accompanying drawings, wherein:

Figs. 3ª and 3ᵇ are, respectively, a side elevation and an end view of the distributing valve appearing in Fig. 3.

2

In the drawings I have illustrated my invention applied to the soot blower disclosed in the application of De Los E. Hibner and Fred C. Arey, Ser. No. 562,858, filed November 10, 1944, as a substitute for the means for manually operating the same; and, for the sake of brevity, the detailed description will be confined to this particular embodiment, although the air motor and its control system may be used for many other purposes.

Figure 1:
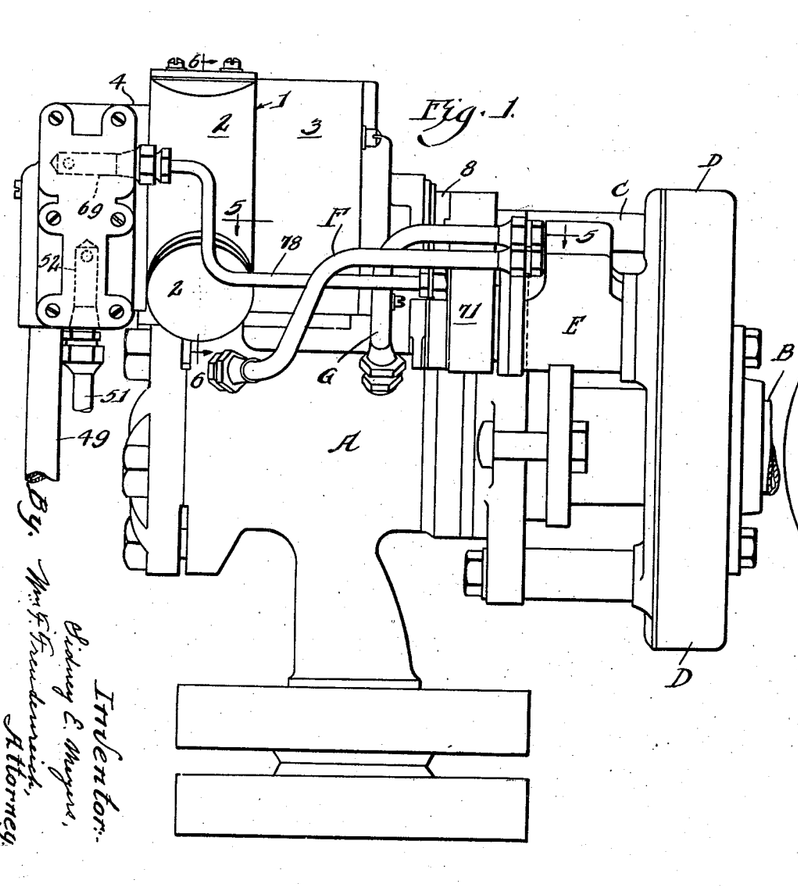
Figure 1 is a side view of a soot blower head equipped with power operating means embodying the present invention.
Figure 2:
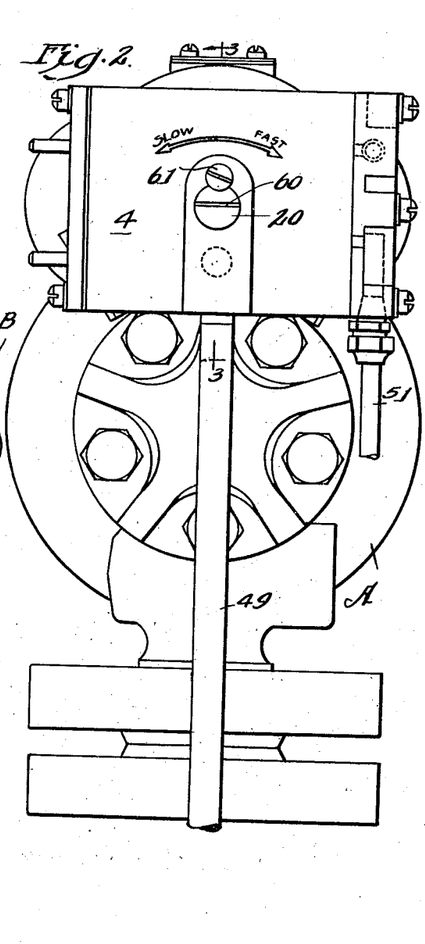
Fig. 2 is an end view of the head, looking from the left toward the left hand end of the apparatus in Fig. 1.

Referring to Figs. 1 and 2, A represents the soot blower head through which steam or other cleaning fluid is supplied to a tubular blowing element B that is turned through any predetermined angle, first in one direction and then back again. The turning of the blowing element is effected by rotating a horizontal shaft C above the head; this shaft acting through a small pinion meshing with a large gear wheel housed in a gear case D and fixed to the blowing element to cause it to turn much more slowly than the shaft. The start of a turning movement of the blowing element results in the operation of an oscillatory pilot valve in a casing E, adjacent to the gear case, to vent steam from behind a main valve in the head through a pipe F to the latter casing and from there, through pipe G, into the blowing element. All of these things are fully disclosed in the aforesaid application and are not shown here in detail, because the new features have for their purpose simply to operate the shaft C under a control system which includes the shaft of the oscillatory pilot valve to which reference will be made later.

Figures 3, 3A, 3B:
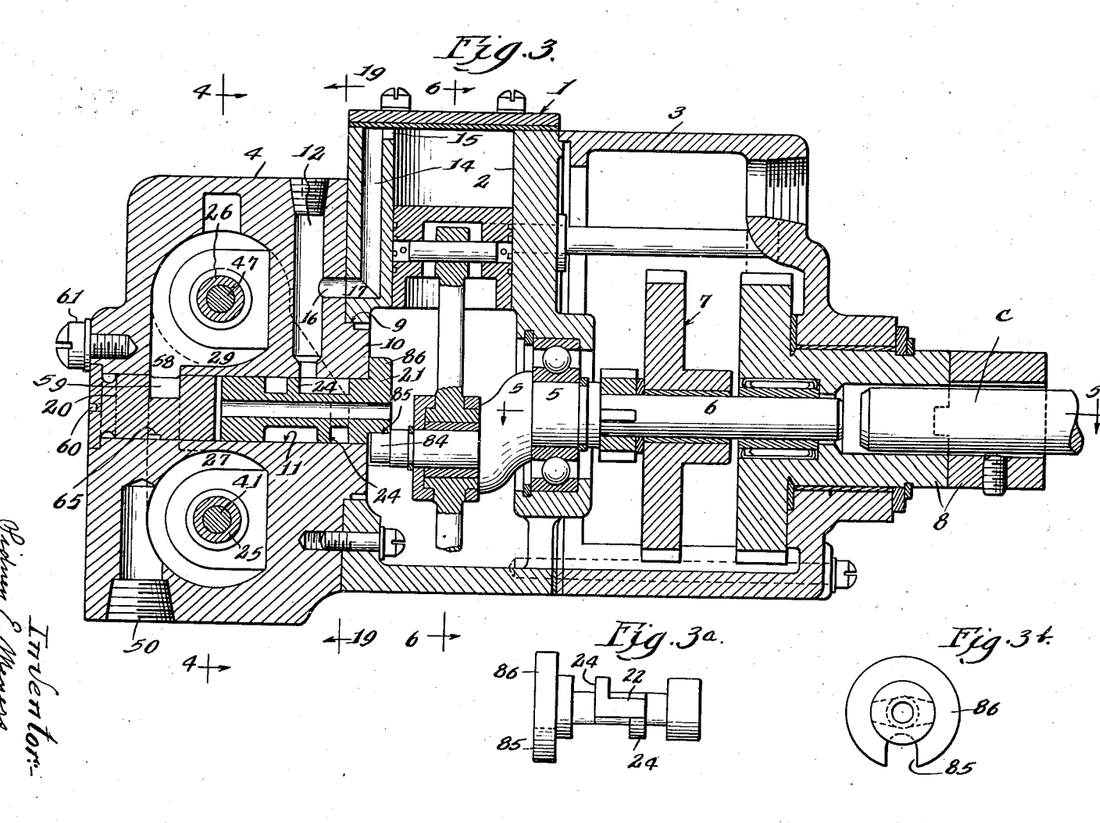
Fig. 3 is a section on line 3—3 of Fig. 2, illustrating, on a larger scale, only the power apparatus.

The motor, indicated as a whole by the reference character 1, is of the three-cylinder, radial type disclosed in the De Los E. Hibner and Fred C. Arey application, Ser. No. 539,552, filed June 9, 1944, and need not here be described in detail. As best shown in Figs. 1 and 3, the motor body or cylinder block 2 is interposed between a gear case 3 and a valve casing 4; these three members being secured together into a single rigid unit. A continuation 6 of motor crank shaft 5 extends into the gear case 3 and, through suitable gearing 7 and a coupling 8, has a driving connection with shaft C; whereby shaft C is rotated slowly, whenever the motor revolves at high speed. Valve casing 4 forms a closure for a large opening 9 in the side of the motor block and concentric with the crank shaft, and preferably has a hub-like part 10 fitted into this opening.

Figure 16:
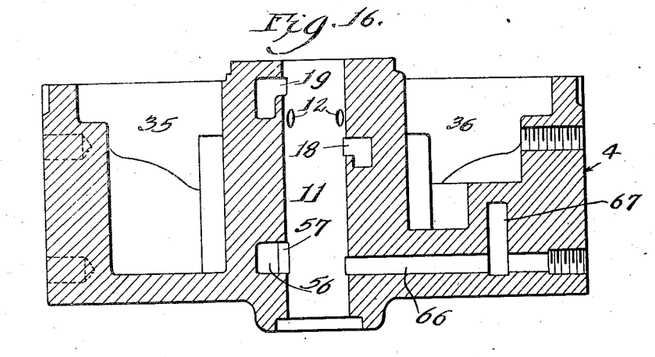
Fig. 16 is a section on line 16—16 of Fig. 4, the end or cover plates being omitted.
Figure 17:
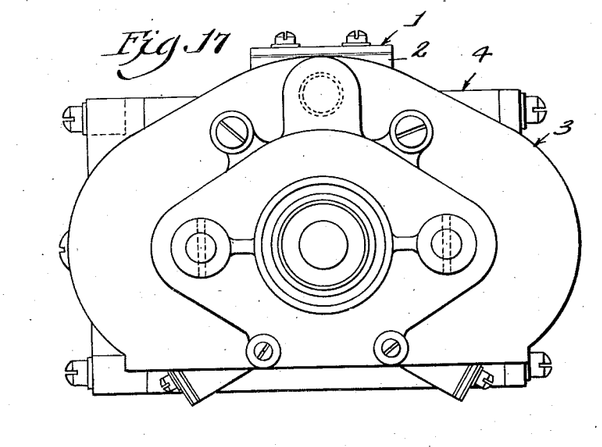
Fig. 17 is a view showing the opposite end of the power plant from that which appears in Fig. 2, no part of the blower head, proper, being shown.
Figure 18:
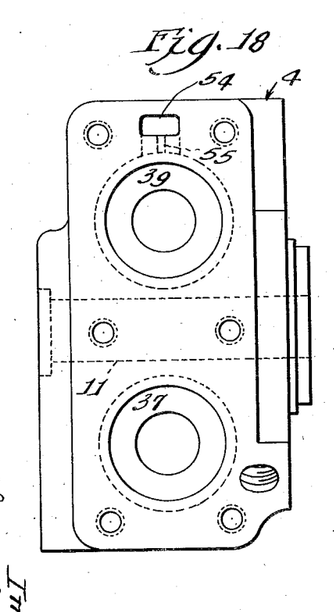
Fig. 18 is an end view of the body member of the main valve casing, corresponding to a section on line 18—18 of Fig. 4 with only the said body member being shown.
Figure 19:
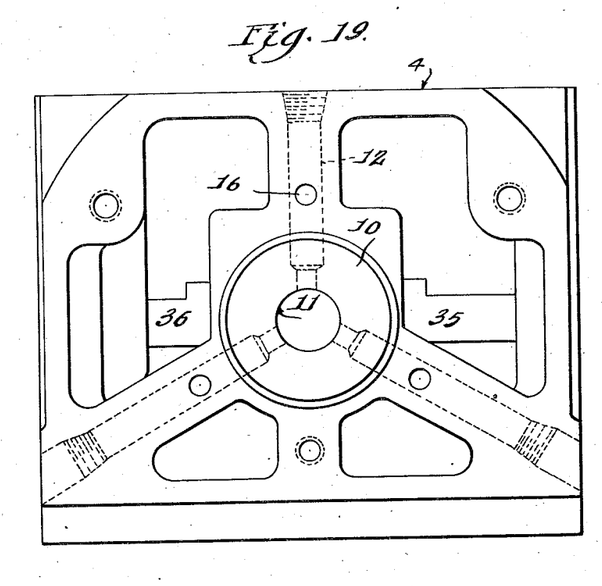
Fig. 19 is an elevational view of the rear side of the main valve casing or, approximately a section on line 19—19 of Fig. 3, with only the main body casting being shown.

The valve casing 4 is a thick casting suitably cored and machined. In the center is a bore 11 that extends entirely through the same, coaxial with the crank shaft. From this bore extend three radial passages 12, each in a longitudinal plane containing the axis of the crank shaft and the axis of one of the cylinders. The inner ends of these passages constitute ports opening out of the bore 11. Each cylinder has in the wall thereof a longitudinal passage 14 that opens into the outer ends of the cylinder through a port 15; each such passage having its axis in the same plane as the axis of the corresponding passage 12. Each passage 12 and the corresponding passage 14 communicate with each other through branch passages 16 and 17 that register with each other when the castings are connected together. As best shown in Fig. 16, there are two other ports, 18 and 19, opening out of the bore, these being near the motor end of the bore and being spaced apart lengthwise of the latter with ports 12 located midway between them. In this bore are two cylindrical plugs 20 and 21, positioned end to end; the first being a throttle valve and the other a distributing valve to connect each port 12 alternately to the ports 18 and 19. Member 21 has the greater part thereof cut away to leave a spool-like piece having two diametrically opposed, longitudinal lands 22, considerably shorter than the distance between the spool heads, at the middle of the spool; corresponding ends of these lands being connected by semicircular lands 24. The lands 24 are oppositely disposed, so that the four lands form a continuous barrier extending irregularly around the center of the plug. The arrangement is such that the ports are never all on one side of such barrier and no port 12 always remains on one side thereof. Member 21 is long enough to cause the section between the unmutilated end portions or heads to span ports 18 and 19. Therefore, if either of these ports is in communication with the atmosphere and the other with a source of supply of compressed air, each engine cylinder will be alternately energized and exhausted during each revolution of the motor.

In the main valve casing 4 are two valves, one for admitting air under pressure into a receiving chamber, and the other for connecting each of ports 18 and 19 either to that chamber or to the atmosphere, depending on the position of the valve. These valves, 25 and 26, respectively, are of the axially movable spool type, positioned one below and the other above the bore 11 and at right angles to the axis of the latter. The body casting of the casing is cored to provide several narrow vertical chambers or compartments below and above the bore 11; there being two that are used, 27 and 28, below the bore, and three, 29, 30, and 31, above. The body casting has two detachable ends or heads 32 and 34, so that bores may extend entirely through the main casting and be closed at their ends by said heads. Such bores may intersect the said chambers or compartments as well as two large vertical chambers 35 and 36 that span the other two groups at opposite ends of the latter, but are spaced apart therefrom; chambers 35 and 36 being open to the atmosphere to constitute the ultimate exhaust outlet for the motor. Each of the two transverse bores has a cylindrical section of large diameter at each end; these sections being numbered 37, 38, 39 and 40. The partition walls between the various vertical chambers or compartments under consideration are machined to provide cylindrical valve seats for cooperation with the cylindrical heads of the spool valves.

Valve 25 is mounted on a long shaft or stem 41 that protrudes at one end through the head 32 of the valve casing, while the other end is adapted to engage the head 34 in one extreme position thereof. On and pinned to the left hand end of rod or shaft 41 is a heavy flanged sleeve member 42, while on the other end is a piston 44 held in place by a nut 45; the valve being clamped between members 42 and 44 when the nut is tightened. Each of the members 42 and 44 has a long neck portion abutting against the adjacent end of valve 25. A spring 46, surrounding member 42 and bearing at one end against the casing head 32 and at its other end against the flange on member 42, tends constantly to force the valve assembly toward the right as viewed in Fig. 4.

Valve 26 is mounted in the same manner as valve 25, on a rod or shaft 47, between an element 42 and a double piston 48, which consists of two pistons spaced apart from each other. A spring 46 tends to push this assembly toward the right until it touches end wall 34.

Figure 12:
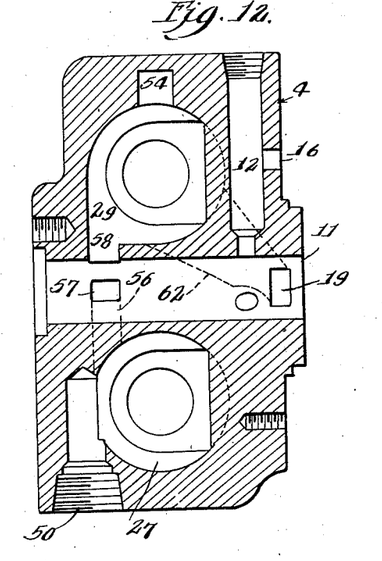

Air under pressure, for driving the motor, enters the main valve casing through a pipe 49, shown in Fig. 1, which screws into an inlet passage 50 connected to chamber 27 and opening out through the bottom of the casing, as shown in Figs. 3 and 12. Air for operating the admission valve 25, against the resistance of its spring, is delivered into the cylindrical bore section 37 through a pipe 51, shown in Fig. 1. This pipe leads from a suitable remote control point and screws into a passage 52 that is located in head member 34 of the main valve casing and opens into such bore section.

Air for actuating the reversing valve 26 enters bore section 39, behind piston 48, from chamber 29, through passage 54 and a bleed passage 55 of much smaller diameter than the latter.

One of the two positions of the admission valve is simply an open position and the other a closed position; while, in one position of the reversing valve, the motor is caused to turn in one direction whereas, in the other position of this valve, the motor must run in the opposite direction.

Figure 4:
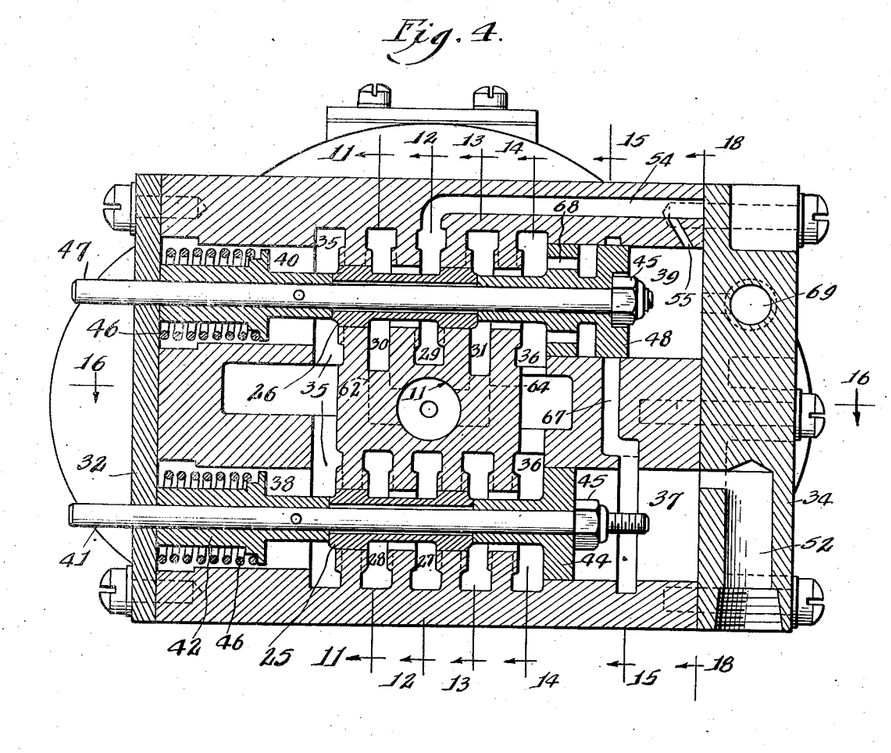
Fig. 4 is a section on line 4—4 of Fig. 3.
Figure 5:
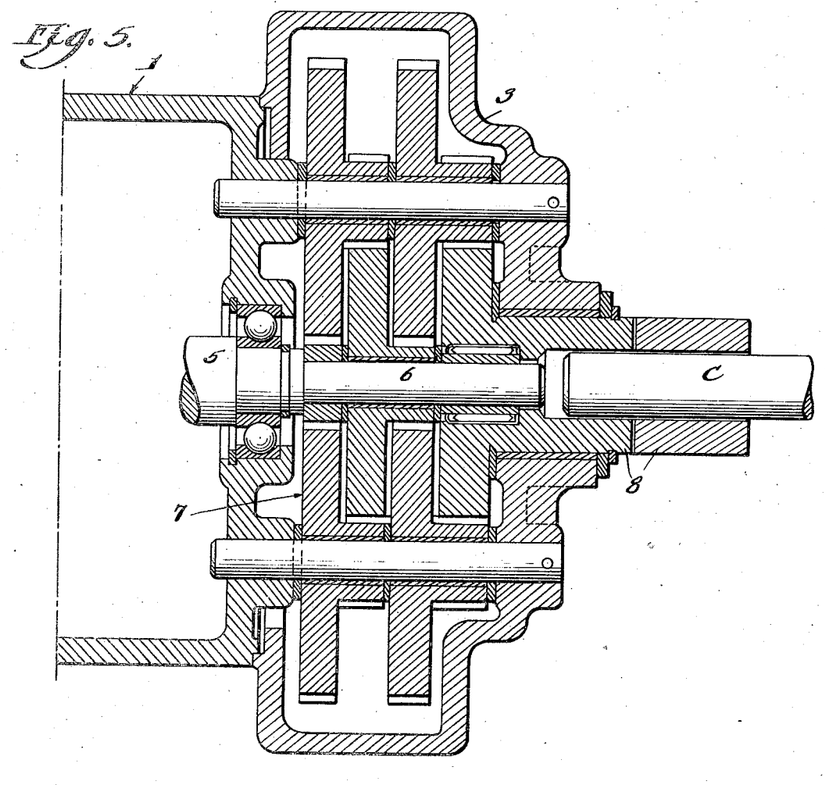
Fig. 5 is a section on line 5—5 of Figs. 1 and 3.
Figure 11:
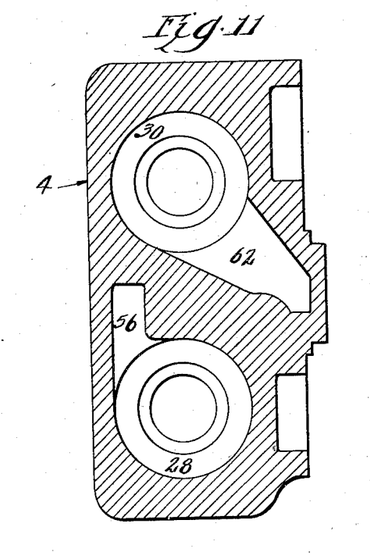
Figs. 11, 12, 13, 14 and 15 are sections taken, respectively, on lines 11—11, 12—12, 13—13, 14—14, and 15—15 of Fig. 4.
Figure 13:
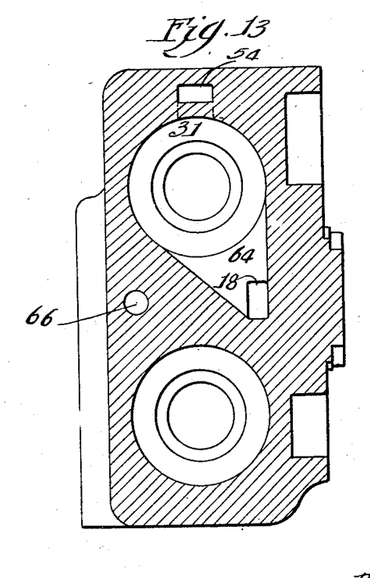
Figure 14:
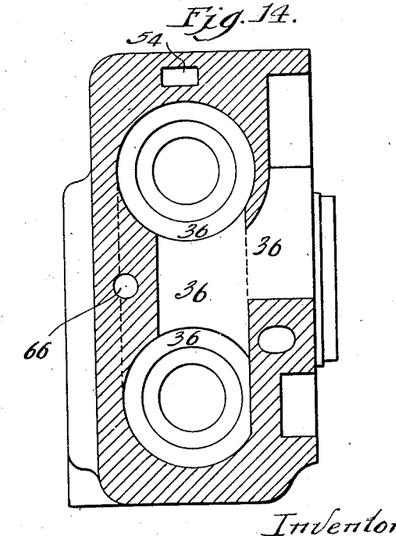
Figure 15:
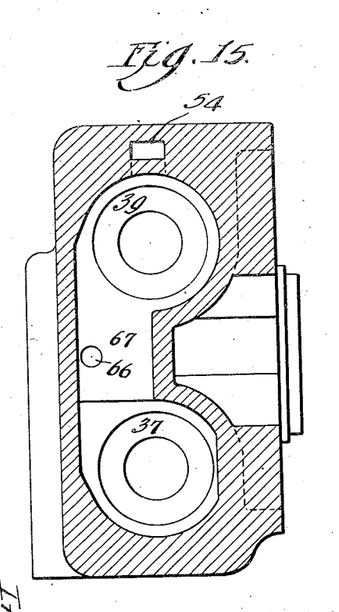

With the parts in the positions which they occupy in Fig. 4, the admission valve being open, air under pressure, from the source of supply, enters chamber 27 and flows to the left, directly into chamber 28. As best shown in Figs 11 and 12, chamber 28 has an upward extension or arm 56 that opens out through a port 57 into one side of that part of bore 11 that throttle valve 20 occupies. Chamber 29 above bore 11, as shown in Fig. 12, has an arm 58 extending down and opening into the top of that same bore, just above port 57. The throttle valve has a groove 59 cut cross-wise into one side opposite the ports through which bore 11 communicates with chambers 28 and 29, the groove being about as wide as these ports. By turning the valve, to adjust it, it may be caused to close port 57 to a greater or lesser degree and thus alter the rate at which air can flow through the valve apparatus to the motor. In this way any desired speed for the motor may be fixed. The throttle valve may have a kerf 60 in the outer end, so that it can be turned by a screwdriver; and it may be clamped in any angular position by a screw 61 screwed into the front of the casing and having its head overlapping and engaging the outer end face of the valve. The throttle valve therefore permits air to flow up into chamber 29 with the admission valve open, as shown; and, with the reversing valve also in its left hand position, air flows from chamber 29 into chamber 30. This latter chamber has an arm 62 extending rearwardly and downwardly and opening out into bore 11 through port 19, as shown in Figs. 11 and 12. When the reversing valve is shifted to the right, it shuts off communication between chambers 29 and 30 and opens communication between chamber 29 and chamber 31. This latter chamber, as shown in Fig. 13, has a downwardly and rearwardly extending arm 64 that leads to port 18; thus permitting air from chamber 29 to reach the distributing valve 21 through port 18 instead of port 19, as before.

When one of ports 18 and 19 is connected to the air chamber 29 to admit air to the motor, the other must be connected to the atmosphere to permit the motor cylinders to exhaust. It will be seen that with the reversing switch in the position that it occupies in Fig. 4, chamber 31 is connected to chamber 36 which opens out through the back of the valve casing into the crank casing of the motor which, in turn, is open to the atmosphere. Thus port 18 is now connected to the atmosphere. In the same way, with the reversing valve shifted over to the right, chamber 30 is connected to the atmosphere through chamber 35, so that port 19 is at that time open to the atmosphere and constitutes the exhaust port.

While the pneumatic actuator for the admission valve is intended to be energized initially by air supplied from an outside source, it is advisable that it remain energized by air entering the casing past the admission valve. To this end the throttle valve has a small groove 65 extending around the same from one end of notch 59 to the other; this groove being in the vertical plane containing a long horizontal passage 66, best shown in Fig. 16, that extends at right angles to the axis of bore 11 from that bore to one side of the valve casing. This passage intersects a large vertical passage 67 extending between and connecting the bores 37 and 39 of the pneumatic actuators for the admission and reversing valves, as best seen in Figs. 4 and 16. This vertical passage is so placed as to be closed at its upper end by the double piston 48 whenever the reversing valve is in either of its two positions. Consequently as soon as the admission valve is opened and the reversing valve is brought into or remains in one of its two positions, holding in air is supplied to the actuator for the admission valve and the operator need not concern himself longer with the push button or other device by the actuation of which air was supplied to open the admission valve. When the reversing valve shifts from either position to the other, the upper end of passage 67 opens into the space between the two members of the double piston, the inner of which contains a number of fairly large holes 68 extending through the same. Consequently, whenever the reversing valve is being shifted, chamber 37 is momentarily opened to the atmosphere through passage 67, holes 68 and chamber 36. The purpose of this will be explained hereinafter.

Figures 6, 7, 8:
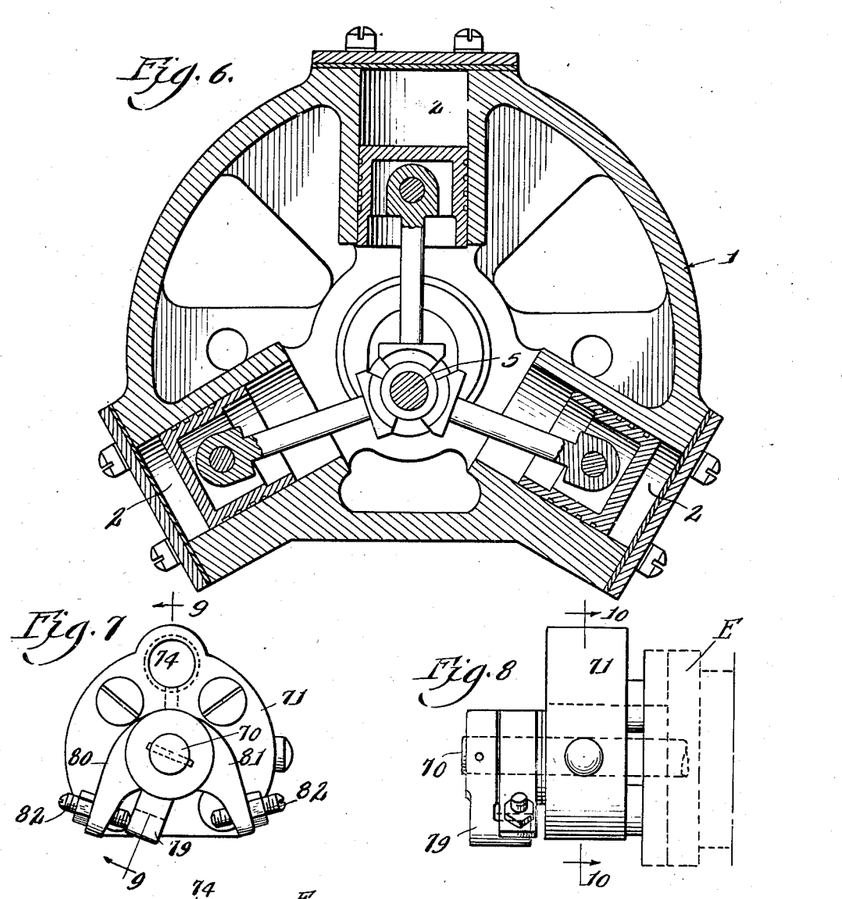
Fig. 6 is a section on line 6—6 of Figs. 1 and 3.
Figs. 7 and 8 are, respectively, an end view and a side view of the pilot valve device that determines the position of the reversing valve for the motor.
Figure 9:
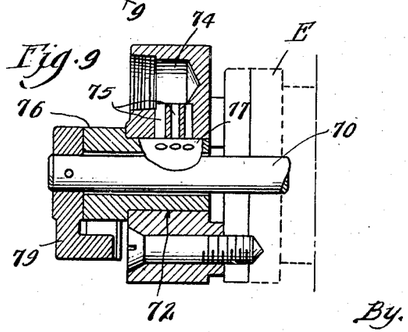
Fig. 9 is a section on line 9—9 of Fig. 7.
Figure 10:
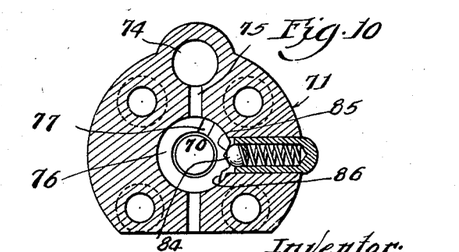
Fig. 10 is a section on line 10—10 of Fig. 8.

Air may be exhausted from the cylinder 39 of the pneumatic actuator for the reversing valve through a passage 69 in the end wall or head 34 of the valve casing. Whenever the outlet from this latter passage is closed, pressure may be built up behind piston 48 through passages 54 and 55 provided that chamber 29 is being supplied with air under pressure. This may be done in any desired way. In the soot blower illustrated, the oscillatory pilot valve in casing E has a shaft 70, shown in Figs. 8 and 9. I make this shaft sufficiently long to permit its outer end to be extended through the casing of 71 of a valve to open and close the outlet from venting passage 69. This casing, which may be fastened to the pilot valve casing E, contains a bore 72, coaxial with but larger than the shaft, and a small chamber 74 that communicates with the bore through one or more passages 75. Rotatable in said bore is a sleeve 76 whose internal diameter is larger than the diameter of the shaft, so as to leave an annular, open-ended space between the interior surface of the sleeve and the shaft. The sleeve has radial holes or ports 77 through one side to register with passages 75 in one angular position of the sleeve. A small pipe or tube 78 connects passage 69, in the main valve casing, and chamber 74.

Therefore, with the parts in the positions shown, the outlet from passage 69 is sealed and the reversing valve is being held in its left hand position by means of air entering its pneumatic actuator from chamber 29. However, when the soot blowing element reaches the end of the stroke which, it may be assumed to have just started, sleeve 76 is turned until ports or holes 77 register with passages 75. Thereupon air escapes at the controlling valve faster than it can be supplied to the pneumatic actuator for the reversing valve through the small bleeder passage 55, and the spring associated with the reversing valve shifts it to the left in Fig. 4. During this movement of the reversing valve, piston 48 momentarily leaves the upper end of passage 67 open and the air in cylinder 37 escapes through the holes 68 in the piston and to the atmosphere through the chamber 36. The spring associated with the admission valve is now able to force this valve toward the right, to its closed position. The motor, its air supply failing, stops.

The manner in which control valve 71 determines the direction of rotation of the motor will now be described. The pilot valve shaft 70 has on its outer end a finger 79 that lies between two fingers 80 and 81 on the outer end of valve member 76. Each of the latter fingers is provided with a set screw 82 to vary the angular distance through which the shaft must turn in order to move its finger out of engagement with one of the fingers on the valve and into engagement with the other of such fingers. In Figs. 7 to 10 finger 79 is assumed to be at the limit of its movement in the clockwise direction. As the motor starts, shaft 70 turns in the counterclockwise direction until it is almost vertical and then stops. During this movement of the shaft sleeve 76 remains in the position illustrated in Figs. 9 and 10. It will be noted that the sleeve is yieldingly held in each of its two working positions, after being moved into the same, by a little spring-pressed ball 84 that drops into one or the other of two notches 85 and 86 in the sleeve, depending on which position the sleeve valve occupies. When the soot blowing element has almost completed its sweep, shaft 70 again starts to turn further in the counterclockwise direction and strikes the set screw on finger 81, carrying the latter along until the sleeve has turned far enough to bring the ports 77 into registration with passages 75; the sleeve being yieldingly locked in that position by the ball which enters notch 86 in the sleeve. The pressure in the pneumatic actuator for the reversing valve is now reduced because the air therein escapes through passage 69, pipe or tube 78 and control valve 71, permitting its spring to force the reversing valve toward the right as viewed in Fig. 4. As this occurs, cylinder 37 vents through passage 67 and piston 48 to chamber 36 and the atmosphere, causing the spring to shift the admission valve to the right and shut off the supply of air to the motor.

Nothing further occurs until air is again admitted into cylinder 37 through pipe 51. When the actuator for the admission valve is again energized, this valve is shifted to the left as it appears in Fig. 4, causing air under pressure to enter chamber 29 as before. The reversing valve is still in its right hand position, causing port 19 in the distributing device to be connected to the atmosphere while port 18 is receiving air for the motor. In other words, the motor runs in the opposite direction from that in which it previously went, causing the blowing element to turn or swing back to the point at which it made its previous start. The reversing valve does not move during this time for, although its actuator is receiving air through bleeding passage 55, it escapes faster through passage 69 than it comes in, and the spring holds the reversing valve in its right hand position. As shaft 79 turns clockwise during this new stroke of the blowing element, reversing the two steps which it made before, finger 79 finally engages the set screw on finger 80; sleeve 76 being thereby returned to the position illustrated in Figs. 9 and 10, closing the outlet from behind the piston that actuates the reversing valve. As a result, pressure quickly builds up behind this piston and the reversing valve is moved back toward the position which it occupies in Fig. 4. During this movement, the outlet end of passage 69 is momentarily uncovered, and air escapes through that passage from behind piston 44, causing the admission valve to close and shut off the air supply. When the admission valve closes, chamber 28 is placed in open communication with chamber 35, namely, with the atmosphere. Consequently, the reversing valve spring can force the air in cylinder 39, behind piston 48, out of the latter and to the atmosphere through passages 55 and 54, chamber 29, the throttle valve and chambers 28 and 35; bringing the reversing valve to its right hand position so that when its pneumatic actuator is again energized, the situation will be the same as in Fig. 4. When the motor starts its direction has once more been reversed.

It will thus be seen that I have produced a simple and compact unit including an air motor, an air admission valve and a reversing valve which requires only the pressing of a push button or the like to start the motor and cause it to stop after it has made a predetermined number of revolutions; together with a small controlling valve for determining the setting of the reversing valve; said small controlling valve being operable in any desired way, particularly by some movable member driven by the motor and which must reverse its direction of movement from time to time.

It will also be seen that the control section of the unit can be completely assembled before being secured to the motor casing. For example, in making the assembly, a small crank pin 84 on the motor shaft moves endwise into a peripheral notch 85 in a flange or head 86 on the inner end of the distributing valve to establish the necessary driving connection for the valve for properly timing the admission and exhaust of operating air from each motor cylinder.

It will further be seen that I have produced a simple and novel driving means for a soot blower element which, while independent of means for controlling the delivery of the cleaning fluid, may be set in motion from the same control point as the latter; and which may be controlled automatically by such means with respect to the direction in which the motor shall run.

While I have illustrated and described with particularity only a single preferred form of my invention, I do not desire to be limited to the precise details thus illustrated and described; but intend to cover all forms and arrangements that come within the definitions of my invention constituting the appended claims.

I claim:

1. In combination, an air motor, an admission valve for controlling a supply of compressed air to operate the motor, a reversing valve between the admission valve and the motor, pneumatic actuators for said valves, means for delivering air to the actuator for the admission valve, and means controlled by the reversing valve to de-energize the latter actuator.

2. An apparatus as set forth in claim 1 having, in addition, means driven by the motor to control the reversing valve.

3. In combination, an air motor having a cylinder, a valve casing containing a chamber and having an exhaust outlet and two parts, an admission valve in the casing for controlling the delivery of compressed air to said chamber, a reversing valve in the casing for connecting either of said ports to the exhaust outlet and the other to said chamber, a movable device in the casing for alternately connecting said ports to said cylinder, and a connection between the motor and said device for actuating the latter.

4. An apparatus as set forth in claim 3 having, in addition, means driven by the motor determining the position of the reversing valve.

5. In combination, an air motor having a plurality of cylinders, a valve casing containing a chamber and having an exhaust outlet and two ports, an admission valve in the casing for controlling the delivery of compressed air to said chamber, a two-position reversing valve in the casing for connecting either of said ports to said chamber and the other to said exhaust outlet, and means driven by the engine to connect said ports alternately to each motor cylinder.

6. In combination, an air motor having a cylinder, a valve chamber containing a chamber and having an exhaust outlet and two ports, a two-position admission valve for controlling the admission of compressed air to said chamber, a two-position reversing valve for connecting either of said ports to the said chamber and the other to said outlet, springs tending constantly to hold the aforesaid valves in one position, individual pneumatic actuators to move the valves into their other positions, means to admit air into the actuator for the admission valve to move it against the resistance of its spring, means to admit air from said chamber into the actuator for the reversing valve, a valve for causing the latter actuator to exhaust to the atmosphere in one position of such valve and to be closed against the atmosphere in another position of that valve, and a distributor driven by the motor to connect said ports alternately to said cylinder.

7. An apparatus as set forth in claim 6, wherein there are stems connected to the admission valve and the reversing valve and protruding from the casing to permit these valves to be operated manually.

8. In combination, an air motor having a cylinder, a valve casing containing a chamber and having an exhaust outlet and two ports, a two-position admission valve for opening and closing communication between said chamber and a source of supply of compressed air, a two-position reversing valve for connecting either of said ports to said chamber and the other to said outlet, means driven by the engine to connect said ports alternately to the cylinder, springs tending constantly to hold the admission valve closed and the reversing valve in one of its positions, pneumatic actuators for the valves acting in opposition to the springs, means to admit air to the actuator for the admission valve, means to supply air to both actuators from said chamber, means controlled by the reversing valve in moving from either position to the other to cause the actuator for the admission valve to be deenergized, and means driven by the motor to determine whether the spring or the pneumatic actuator shall be effective at any given time for positioning the reversing valve.

9. In combination, an air motor having a cylinder, a valve casing attached to the motor and provided with a chamber and an exhaust outlet and two ports, an admission valve in the casing for controlling the delivery of compressed air into said chamber, a spring tending constantly to hold the admission valve closed, a pneumatic actuator for opening the admission valve, a throttle valve between the admission valve and said chamber, means to deliver air directly into said actuator to open the admission valve, means to cause holding in air to flow from said chamber into the actuator after the admission valve opens, a reversing valve for connecting either of said ports to said chamber and the other to said outlet, a spring to hold the reversing valve in one of its positions, means actuated by air delivered from said chamber to shift said reversing valve into its other position, and a distributing valve in the casing and driven by the motor to connect said ports alternately to the cylinder.

10. An apparatus as set forth in claim 9, wherein means are provided to cause the reversing valve to place the actuator for the admission valve in communication with the exhaust outlet after each predetermined number of revolutions of the motor.

SIDNEY E. MEYERS.

REFERENCES CITED

The following references are of record in the file of this patent:

UNITED STATES PATENTS

| Number | Name | Date |
|---|---|---|
| 1,824,058 | Scott | Sept. 22, 1931 |
| 1,947,191 | Davis et al. | Feb. 13, 1934 |